United States Patent Office 3,112,249
Patented Nov. 26, 1963

3,112,249
PROCESS OF SPLITTING STEROIDS
Harry A. Toulmin, Jr., Dayton, Ohio, assignor to The Commonwealth Engineering Co. of Ohio, Dayton, Ohio
No Drawing. Filed Dec. 10, 1962, Ser. No. 243,621
3 Claims. (Cl. 195—51)

This invention relates to enzymatic processes for the splitting and destroying of steroids, sterols, lipids and the like complex polycyclic compounds containing 25 or more carbon atoms in the molecule. The process of the invention is exemplified in the splitting and destruction of sterols such as cholesterol and solid fatty alcohol derivatives of cyclopententenes, derivatives of phenanthrene, and the like, which are relatively stable substances and difficult to degrade or hydrolyze.

Enzymes are complex protein compounds and commonly known as biochemical catalysts. The present invention concerns the use of the proteolytic enzymes of plants as a splitting agent. The enzymes of plants, such as papain and which is obtained from the latex of the green fruit of Carica papaya is preferably utilized. The fresh latex of this fruit exhibits a very powerful proteolytic enzyme action. This is employed in the present invention to split long chain molecules of chemical compounds which are difficult to degrade by other methods.

Reference throughout the specification to "papain" and "papaya enzyme" is intended to include papains having a molecular weight of 27,000 to 30,000, as well as chymopapain (molecular weight of about 45,000) and the other proteolytic enzymes found in the papaya latex.

While it is known that sterols are converted to their simple elements by microorganisms present in soils, little is known of the degrading microorganisms responsible for this action or the full nature of the reaction which takes place.

It is also known that sterols such as cholesterol can be oxidized with strong dichromate-sulfuric solutions to form the corresponding lower molecular weight ketones as reported by Leobisch, Doree and Diels (see Ber. 5, 510 (1872); Soc. 1328 (1908); C. Doree ibid, 95, 639 (1909), and Ber. 41, 2596 (1908). Further, Windaus and Resau, Ber. 46, 1246 (1913), found that the oxidation of cholesteryl acetate in boiling acetic acid and chromic acid produced methyl isohexyl ketone. Such processes have the disadvantage, however, that corrosive acids are required and it is difficult to control the action to produce the desired lower molecular weight compounds.

Enzymatic splitting processes for producing fatty acids and glycerol from fats, e.g., fatty acid triglycerides in the manufacture of soaps are also well known. Enzymes also have been found which are useful for splitting acyl amino acids. For example, benzoyl amino propionic acid has been reported to be split by the action of hippuricase enzyme to give benzoic acid (Neuberg and K. Linhardt, Biochemical Zeitschr. 147; 372–376 (1924)). Fatty acid glycerides and amino compounds, however, are relatively easily degraded, but such processes cannot be used successfully to split a sterol such as cholesterol which has been found to remain unchanged after boiling in aqueous potassium hydroxide solution for hours.

The prior art processes thus fail to provide a method of splitting and destroying these poly-ring steroid-type compounds by enzymatic catalysis. Moreover, prior processes are applicable only to in vitro methods whereas the enzymatic process of this invention may be employed for splitting and destroying sterols by either in vitro or in vivo treatment methods. More recently, it has been proposed to utilize organic solvents which dissolve these sterols, e.g. cholesterol, but such compounds are more or less toxic and furthermore do not eliminate the sterols but merely put them in solution.

It is the principal object of the present invention to provide a process for spliting and completely destroying steroids, e.g., cholesteryl acetate, and sterols, especially cholesterol, ergosterol, lanosterol, stigmasterol and the like poly-ring compounds of the monohydroxy secondary alcohol type which are difficult to split into lower acyclic chain compounds.

It is a further object of the present invention to provide an improved process of splitting these complex compounds by treatment of the same with a powerful enzymatic action which splits open the ring structure and breaks up the compound into lower molecular weight acyclic components.

Cholesterol is probably best known of the sterols. This is because it has been found to be the predominant constituent of human gall stones deposited in the bile duct. It also forms deposits in the veins and causes hypertension. It has the empirical formula $C_{27}H_{45}OH$ and in crystalline form melts at 149° C.

The structural molecular configuration of cholesterol as well as ergosterol, lanosterol and stigmasterol are shown in the formulae:

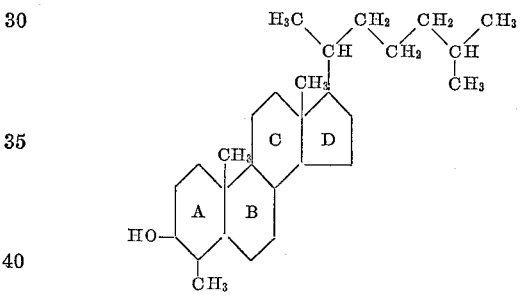
Cholesterol

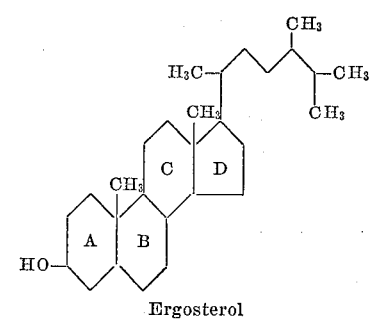
Ergosterol

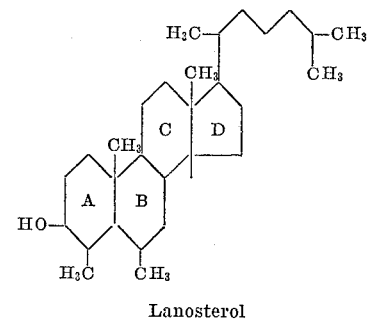
Lanosterol

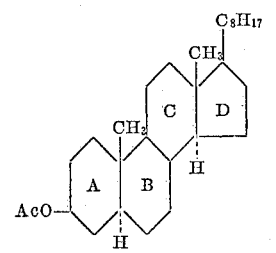

Chloesteryl acetate

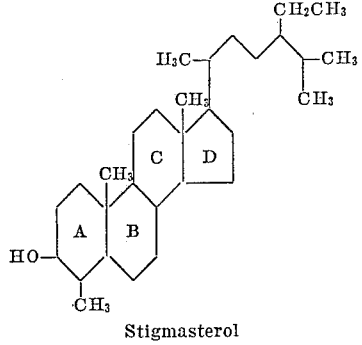

Stigmasterol

In accordance with the present invention, a new enzymatic process is provided for splitting and destroying these complex cyclopententenophenanthrene compounds whereby there is produced therefrom relatively low molecular weight aliphatic or acyclic compounds. The splitting or degradation of the steroids is accomplished by subjecting the compounds to a powerful enzymatic catalytic action. Enzymes specific to the splitting of cyclo structures and enzymes specific to the breaking down of long chain structures into lower molecular weight acyclic compounds are employed.

The splitting and destructive action produced by the enzymatic catalysis is illustrated graphically and employing the steroid nucleus structure as follows:

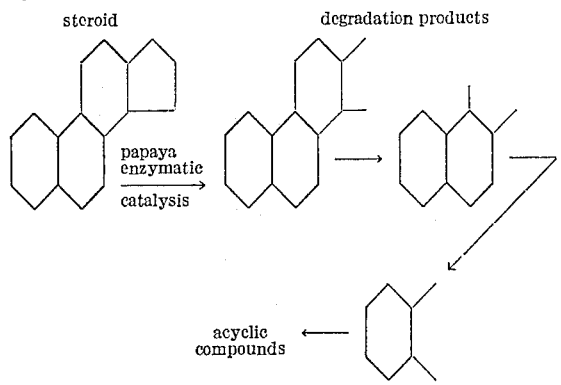

Typical enzyme solutions are as follows—

Enzyme A

Papain crystals are dissolved in ethyl alcohol; fifteen grams of the crystals dissolved in 85 grams of alcohol may be made up for use as a proteolytic enzyme solution.

Enzyme B

A papain latex solution is prepared comprising by weight of papaya latex solids 35% and sodium chloride 20% in distilled water 45%.

Enzyme C

A papaya solution containing papain latex solids 35%, sodium sulfide 10%, sodium chloride 10% and water 45%.

In carrying out the splitting action of the sterols in accordance with the invention, concentrations of the enzymes of 2 to 10% by weight of the mass or solution are preferably employed to treat the steroid compound. The process of splitting of the sterols in accordance with the invention will be understood from the following examples which are exemplary.

Example 1

To a 10% sterile solution of cholesterol dissolved in benzene is added a portion of enzyme A. Approximately 15 cc. of the enzyme A is added to 100 cc. of the cholesterol solution and the resulting mixture maintained for a temperature of 28° C. for six to eight hours or overnight while slowly stirring to produce degraded compounds including beta-hydroxy-beta-methyl-glutaric acid.

Example 2

Enzymatic splitting of ergosterol is carried out as set forth in Example 1, to produce acyclic degraded products.

Example 3

The process described in Example 2 is repeated using enzyme B instead of A to produce degraded compounds of cholesterol.

Example 4

In the instant example lanosterol is substituted for cholesterol and the degradation carried out as described in Example 1, and using enzyme C to effect the splitting action.

The papain enzyme is stable at pH values above 7, and works best in solutions of pH 10.5. Below about pH 4.5 the enzyme is relatively inactive. The pH of reactant solutions are thus controlled to produce the best results.

Various substitutions and changes may be made in the process by those skilled in the art without departing from the spirit and scope of the invention, and as more particularly defined in the appended claims.

What is claimed is:

1. A process of splitting and destroying cholesterol and converting the same into lower molecular weight aliphatic compounds which comprises reacting a solution of said steroids with a papaya enzyme solution containing papain latex for a time sufficient to bring about degradation of said steroids to lower molecular weight acyclic compounds.

2. A process of splitting and destroying ergosterol and converting the same into lower molecular weight aliphatic compounds which comprises reacting a solution of ergosterol with a papaya enzyme solution containing papain latex for a time sufficient to bring about degradation of said ergosterol to lower molecular weight acyclic compounds.

3. A process of splitting and destroying lanosterol and converting the same into lower molecular weight aliphatic compounds which comprises reacting a solution of lanosterol with a papaya enzyme solution containing papain latex for a time sufficient to bring about degradation of said lanosterol to lower molecular weight acyclic compounds.

References Cited in the file of this patent

Sumner et al.: Chemistry and Methods of Enzymes, 3rd edition, Academic Press Inc., New York, 1953, pages 181–183. (Copy in Division 63.)